United States Patent [19]
Watson

[11] Patent Number: 5,631,543
[45] Date of Patent: May 20, 1997

[54] ELECTRONIC VOLTAGE REGULATOR AND IDLE CONTROL CIRCUIT FOR GENERATORS

[75] Inventor: Christopher L. Watson, Rock Hill, S.C.

[73] Assignee: Homelite Inc., Charlotte, N.C.

[21] Appl. No.: 407,647

[22] Filed: Mar. 21, 1995

[51] Int. Cl.$^6$ ..................................................... H02P 9/10
[52] U.S. Cl. ................. 322/27; 322/19; 322/18; 322/36
[58] Field of Search ...................... 322/25, 26, 27, 322/28, 29

[56] References Cited

U.S. PATENT DOCUMENTS

| | | | |
|---|---|---|---|
| 4,459,489 | 7/1984 | Kirk et al. | 290/13 |
| 4,459,490 | 7/1984 | Brandon | 290/40 |
| 4,629,968 | 12/1986 | Butts et al. | 322/29 |
| 4,636,706 | 1/1987 | Bowman et al. | 322/28 |
| 4,697,135 | 9/1987 | Brandon | 322/24 |
| 5,225,764 | 7/1993 | Falater | 322/28 |
| 5,293,076 | 3/1994 | Fukui | 290/40 |
| 5,376,877 | 12/1994 | Kern et al. | 322/32 |
| 5,444,592 | 8/1995 | Shimizu et al. | 361/21 |

OTHER PUBLICATIONS

Product Brochure—Homelite Textron, Homelite Industrials Products Catalog 1987–1988 (undated) pp. 20–28.

*Primary Examiner*—Steven L. Stephan
*Assistant Examiner*—Nicholas Ponomarenko
*Attorney, Agent, or Firm*—Perman & Green, LLP

[57] ABSTRACT

A method for controlling an AC generator includes a first step of varying the duty cycle of a pulse width modulated signal as a function of an output voltage appearing across at least one output winding so as to increase the duty cycle as the output voltage decreases and to decrease the duty cycle as the output voltage increases. A second step controls the current flow within a rotor winding in accordance with the pulse width modulated signal so as to decrease the current flow when the output voltage increases and to increase the current flow when the output voltage decreases. The method further includes the steps of (a) monitoring a current flow through the at least one output winding so as to detect an unloaded condition and, in response to detecting an unloaded condition, (b) delaying a first predetermined period of time; and (c) initiating an idle condition by slowing the speed of the drive engine. Further in response to detecting an unloaded condition, the method includes the steps of (d) delaying a second predetermined period of time; and (e) automatically decreasing the duty cycle of the pulse width modulated signal so as to decrease the current flow within the rotor winding to thereby decrease the output voltage. Circuitry for accomplishing the method is also described.

11 Claims, 5 Drawing Sheets

ELECTRONIC VOLTAGE REGULATOR AND IDLE CONTROL CIRCUIT FOR GENERATORS

FIELD OF THE INVENTION

This invention relates generally to generators of electrical power and, in particular, the invention relates to electrical generator voltage regulation and idle control circuitry and apparatus.

BACKGROUND OF THE INVENTION

Motor generator units that include an AC generator and an internal combustion drive engine are well known. Also known are generator output voltage control systems and also idle control systems that control the speed of the drive engine.

For example, commonly assigned U.S. Pat. No. 4,459,490, issued Jul. 10, 1984, entitled "Idle Control System for Generators" by George M. Brandon, describes the use of a speed responsive governor to maintain a relatively constant engine speed regardless of the electrical load being powered by the generator, except when the generator is unloaded. An idle control circuit detects the no-load condition and actuates a device, such as a solenoid or an electromagnet, to vary a throttle and reduce the speed of the drive engine to a predetermined idle speed. In the approach of Brandon a high sensitivity electronic switching element is rendered conductive upon the absence of current draw from the generator to complete a current path through an idle control electromagnetic coil.

In commonly assigned U.S. Pat. No. 4,697,135, issued Sep. 29, 1987, entitled "Electronic Voltage Regulator", also by George M. Brandon, there is described the use of a rectified and filtered representation of the output voltage of the generator, which is proportional to the output voltage and which has a ripple component, and also the use of a dc voltage that is proportional to the frequency of the generator output. A comparator compares these two voltages. The comparator includes hysteresis so that it switches on and off with the ripple voltage component. A signal produced by the comparator controls the application of current from a quadrature winding of the generator to the generator field so as to maintain the output voltage of the generator substantially constant.

More particularly, as the output voltage of the generator falls a duty cycle of a comparator increases. This increase in duty cycle, operating through a power stage, causes an increase in a generator field current and a consequent increase in the output voltage. Conversely, as the output voltage of the generator rises the duty cycle of the comparator decreases. The decrease in duty cycle, operating through the power stage, causes a decrease in the generator field current and a consequent decrease in the output voltage.

While the idle control system and the voltage control system disclosed in the foregoing U.S. Patents are well suited for their intended applications, it is one object of this invention to provide an improved idle and voltage control system for use in a motor generator.

The inventor has recognized that the lowering of the generator output voltage during idle periods is an important consideration. As may be realized, if the voltage is not lowered during this time the voltage regulator circuitry will attempt to maintain the generator voltage at its nominal level. However, since the speed of the drive engine is lowered during idle periods, the generating capability of the generator is reduced, resulting ultimately in the potential to apply large currents to the excitation winding of the rotor. This is generally unacceptable as it tends to overheat the rotor, due to the combination of high currents and a reduced airflow that results from the lower generator speed. An ability to reduce the generator output voltage during an idle period would beneficially eliminate the high rotor currents.

Another problem that the inventor has recognized relates to running the generator with an intermittent load. For example, if a drill were plugged into the generator and used intermittently, as would occur when a series of holes were being drilled, the generator would repetitively cycle between a loaded and an unloaded state. As a result, the idle control system would operate to speed up and slow down the drive engine in an attempt to respond to the loading and unloading of the generator. As can be appreciated, a rapid and prolonged cycling of the drive engine speed may be undesirable.

A further problem that has been recognized relates to a conventional voltage regulator circuit which monitors only one output line of the generator. A heavy load placed on the monitored line may cause the voltage on the un-monitored line to rise to high levels. Conversely, if a heavy load is placed on the un-monitored line, the voltage regulator will not react to the drop in that line's voltage. This may result in the induction motor starting capability of that line being compromised. These voltage extremes may also be damaging to any equipment that is connected to the un-monitored line.

Another problem recognized by the inventor relates to the starting of the generator. That is, in many cases it is required to provide a large quadrature or excitation winding to provide sufficient rotor excitation during start-up. However, providing a quadrature winding that provides a large output voltage can be detrimental during times of extreme overload, as it may adversely impact the ability of the generator output voltage to collapse at a correct rate.

SUMMARY OF THE INVENTION

The foregoing and other problems are overcome and the object of the invention is realized by a method, and by circuitry constructed for accomplishing the method, that controls an alternating current electrical generator of the type having, by example, a drive engine, stator-mounted output windings and excitation windings, and a field or rotor winding. The method comprises a first step of varying the duty cycle of a pulse width modulated signal as a function of an output voltage appearing across at least one output winding so as to increase the duty cycle as the output voltage decreases and to decrease the duty cycle as the output voltage increases. A second step controls the current flow within the rotor winding in accordance with the pulse width modulated signal so as to decrease the current flow when the output voltage increases and to increase the current flow when the output voltage decreases. The method further includes the steps of (a) monitoring a current flow through the at least one output winding so as to detect an unloaded condition and, in response to detecting an unloaded condition, (b) delaying a first predetermined period of time; and (c) initiating an idle condition by slowing the speed of the drive engine.

Further in response to detecting an unloaded condition, the method includes the steps of (d) delaying a second predetermined period of time; and (e) automatically decreasing the duty cycle of the pulse width modulated signal so as to decrease the current flow within the rotor winding to thereby decrease the output voltage.

The at least one output winding is comprised of a first line L1 and a second line L2, and the step of varying includes a step of monitoring the voltage appearing across both L1 and L2. The step of varying the duty cycle of the pulse width modulated signal varies the duty cycle in accordance with the average voltage between L1 and L2.

Further in accordance with this invention a method is provided for controlling a rotor current of an alternating current electrical generator of the type having a drive engine, at least one output winding, and an excitation or quadrature winding. The method includes the steps of, during a start-up condition, rectifying an AC voltage output by the excitation winding to produce a first rectified DC voltage; rectifying an AC voltage output by the at least one output winding to produce a second rectified DC voltage; and combining and filtering the first and second rectified DC voltages to produce a rotor winding drive current. At a predetermined magnitude of the AC voltage output by the at least one output winding, the method further includes the steps of varying the duty cycle of a pulse width modulated signal as a function of the AC voltage appearing across the at least one output winding so as to increase the duty cycle as the AC voltage decreases and to decrease the duty cycle as the AC voltage increases; and controlling the rotor winding drive current in accordance with the pulse width modulated signal so as to decrease the rotor winding drive current when the AC voltage increases and to increase the rotor drive current when the AC voltage decreases.

BRIEF DESCRIPTION OF THE DRAWING

The above described aspects of this invention are made more apparent and are more fully described in the following Detailed Description of the Invention, which is intended to be read in conjunction with the Figures of the attached Drawing, wherein.

DETAILED DESCRIPTION OF THE INVENTION

The above-described commonly assigned U.S. Pat. Nos. 4,459,490 and 4,697,135 are incorporated by reference herein in their entireties.

Figure 1:
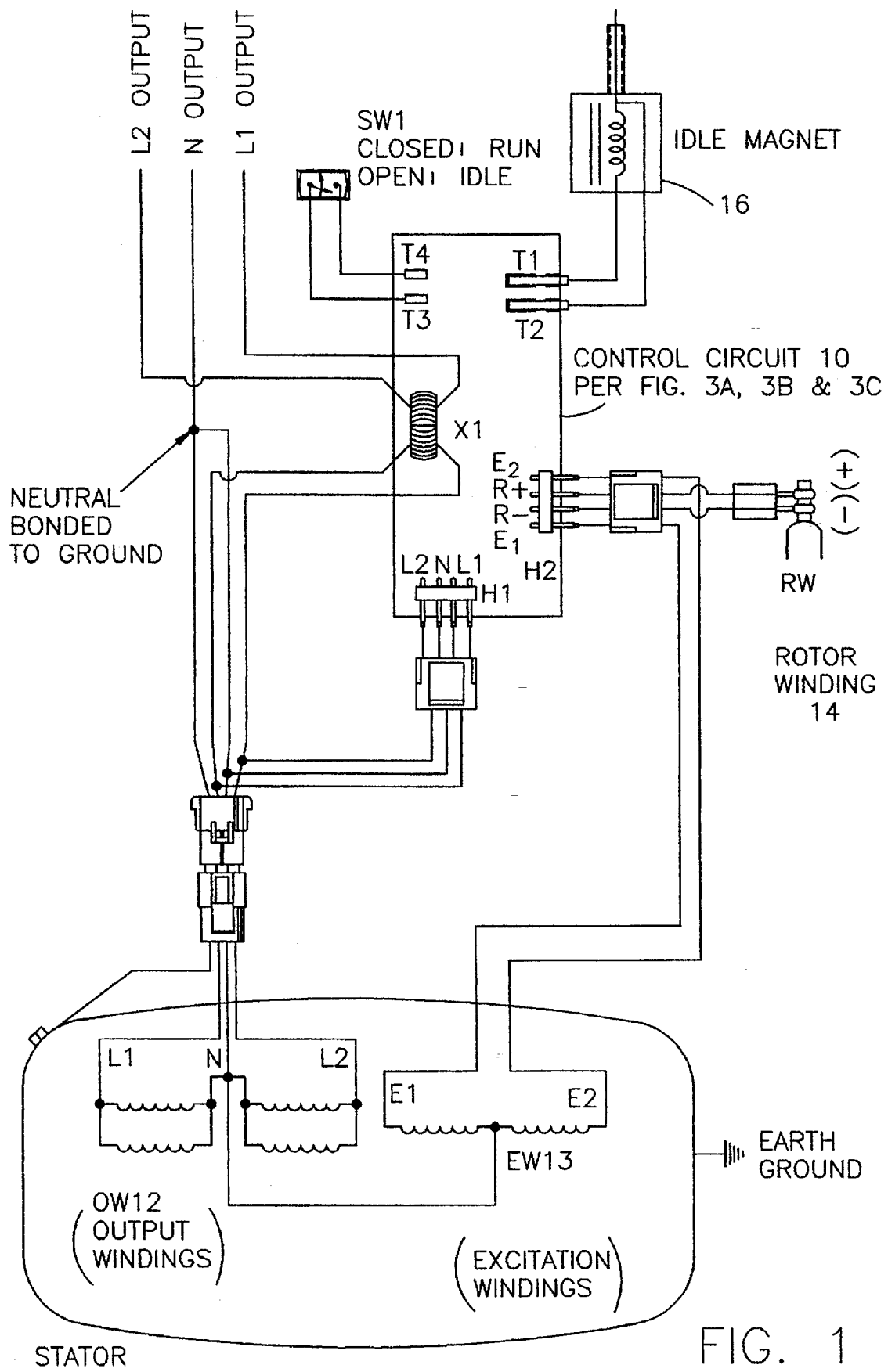
FIG. 1 is a schematic diagram illustrating in particular the various generator windings and their connection to the control circuit of this invention.
Figure 2:
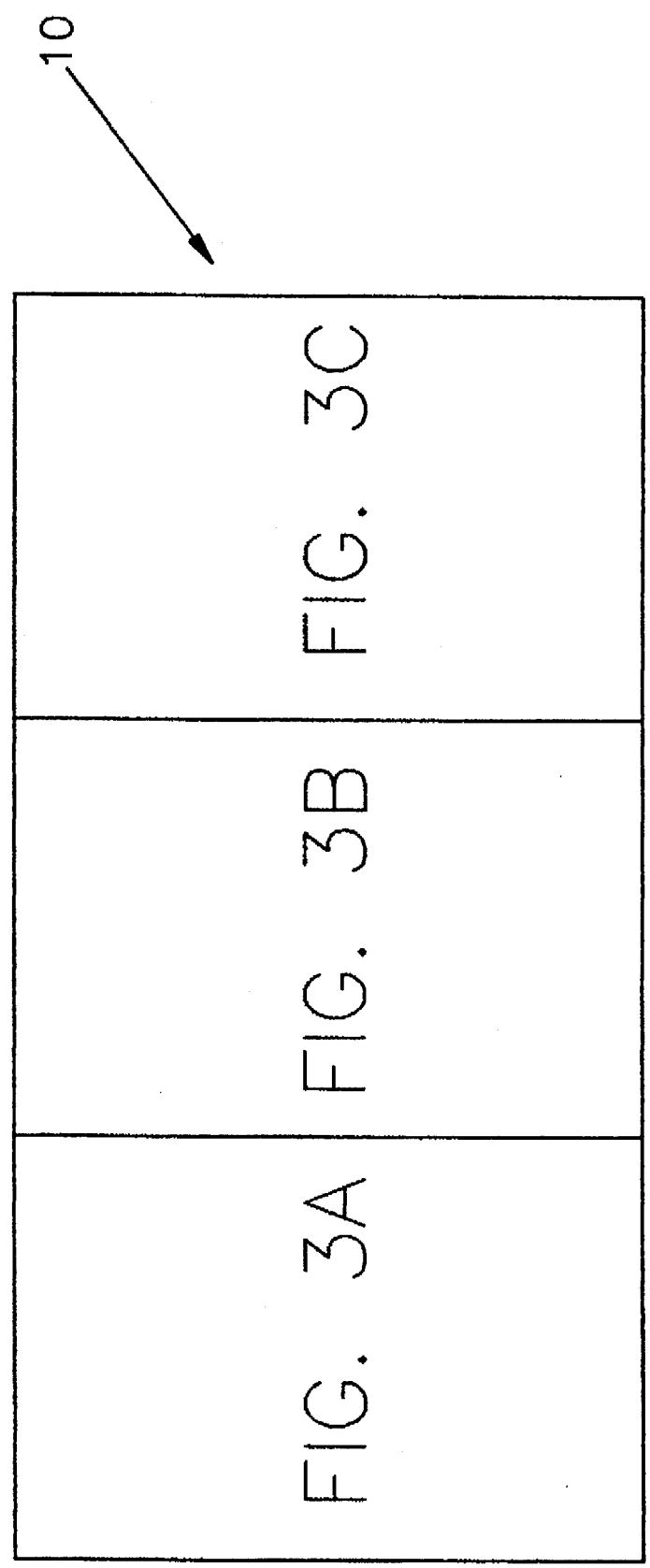
FIG. 2 depicts the relative alignment of FIGS. 3A, 3B and 3C.
Figure 3A:
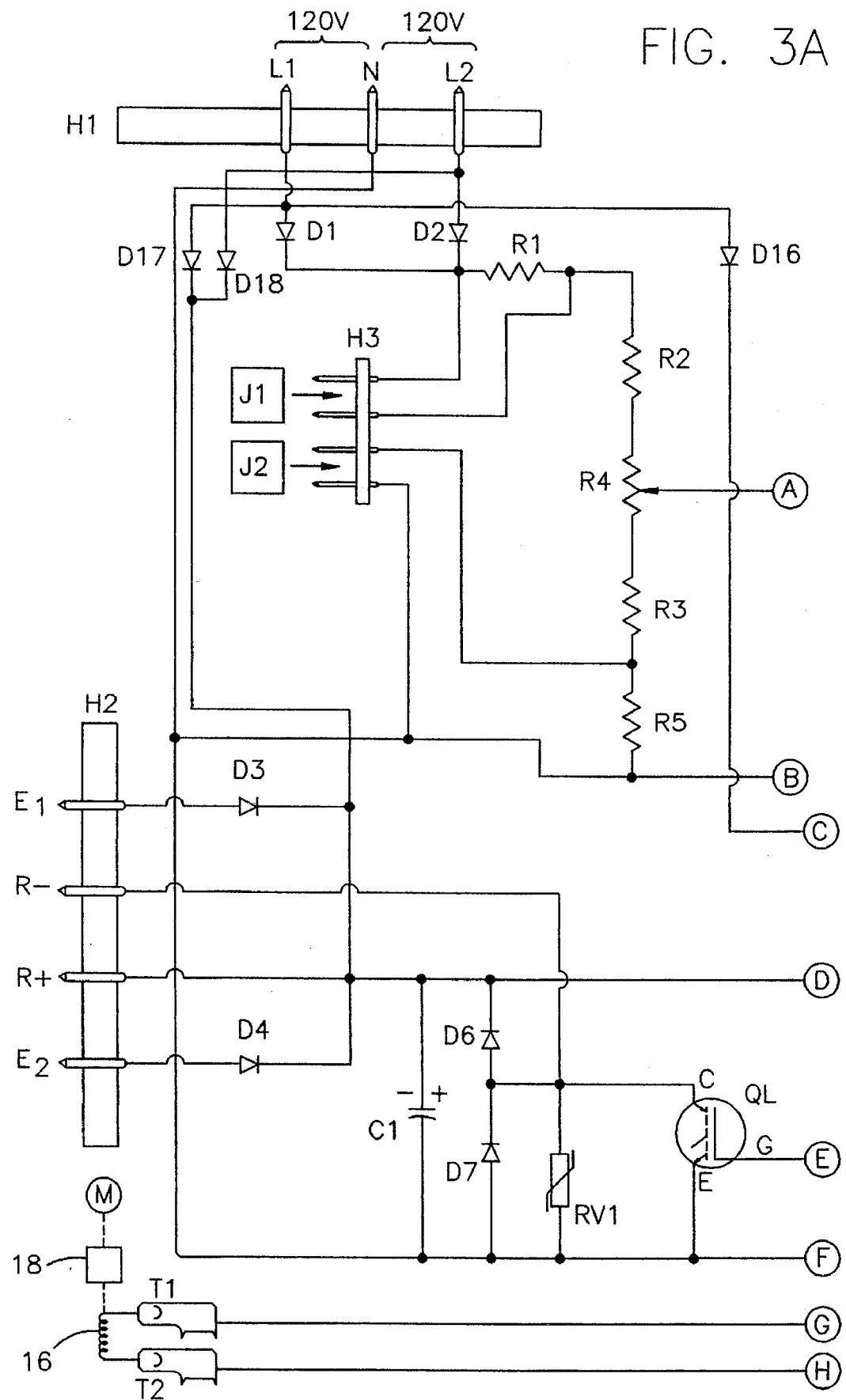
FIGS. 3A–3C are a schematic diagram of a preferred embodiment of the generator control circuit of this invention.
Figure 3B:
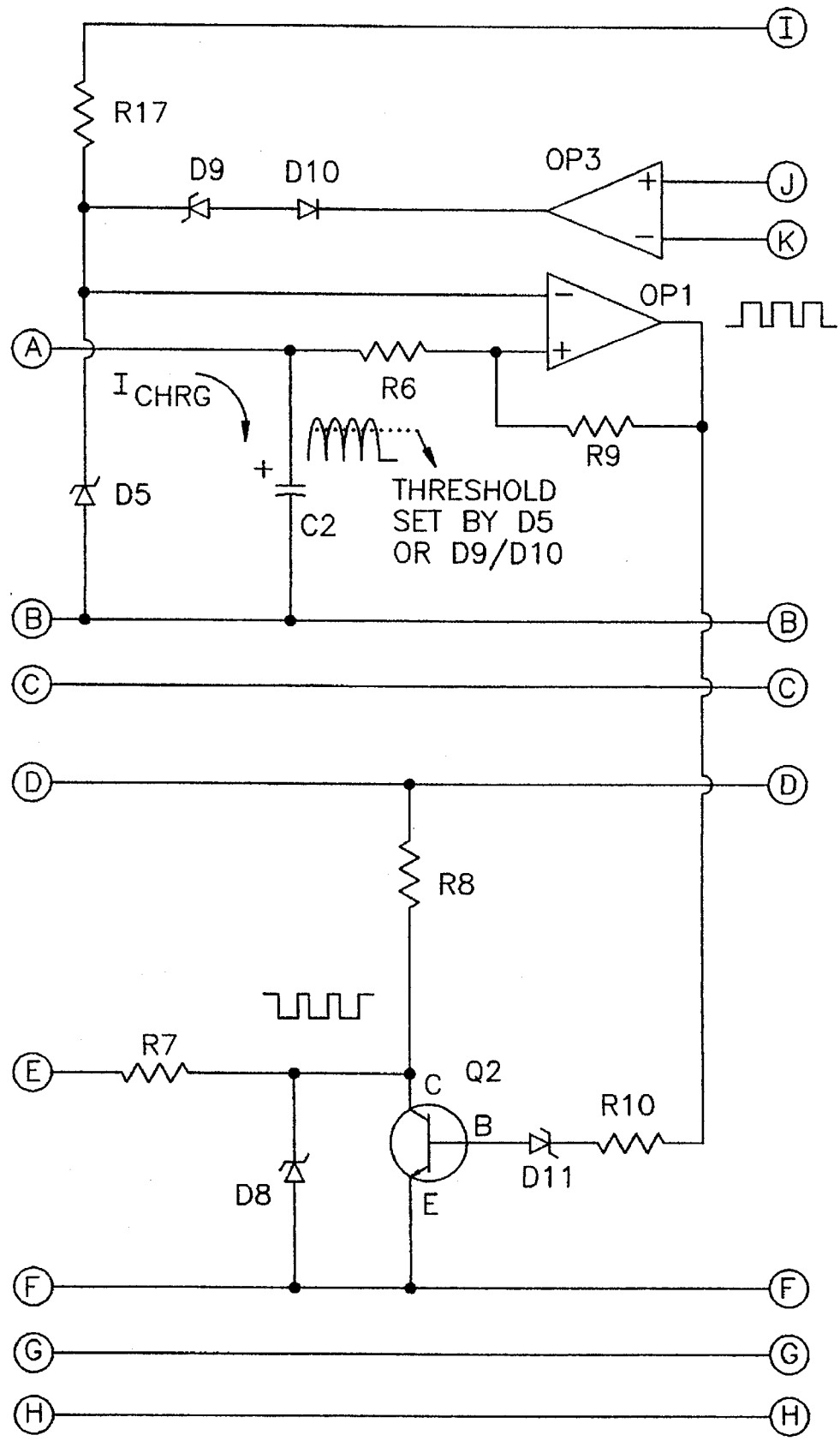
Figure 3C:
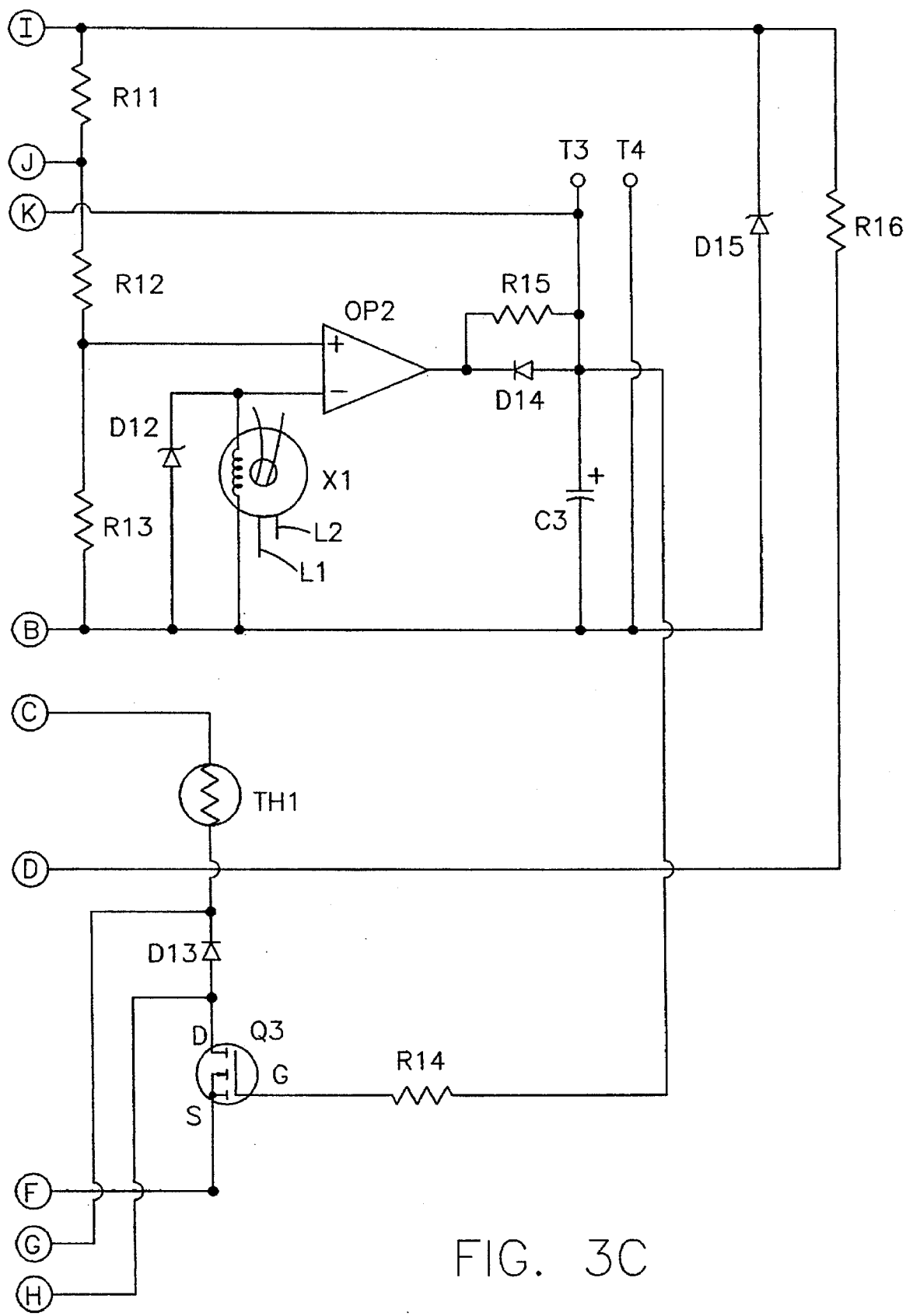

Reference is made to FIGS. 3A–3C for showing a preferred embodiment of a Generator Voltage Regulator and Idle Control Circuit 10 that is constructed and operated in accordance with this invention. The control circuit 10 includes connectors or headers H1 and H2 for interfacing to 120 V or 120/240 V stator-mounted output windings (OW) 12, to stator-mounted excitation windings (EW) 13, and to field or rotor windings (RW) 14, respectively. All of these various windings are shown in FIG. 1, as are various connectors and the like. The control circuit 10 operates to control the voltage output of the generator OWs 12 to within a specified tolerance, for example ±6%, of a nominal voltage, and also operates to reduce the output voltage of the generator during idle conditions.

When used with a generator configured for 120/240 V operation (jumpers J1 and J2 both installed on header H3), one half of the output voltage waveform cycle (positive ½ cycle in relation to Neutral (N), as rectified by D1) of the AC output voltage appearing on L1 is input to capacitor C2, and one half of the waveform cycle (positive ½ cycle in relation to Neutral, as rectified by D2) of the AC output voltage appearing on L2 is also input to C2. In that these positive ½ cycles occur at different times during the AC waveform, C2 is charged by a full wave rectified current ($I_{CHRG}$). One half of $I_{CHRG}$ is derived from L1, and one half of $I_{CHRG}$ is derived from L2. The magnitude of $I_{CHRG}$ is determined by the resistor network comprised of fixed resistors R2 and R3, and the variable resistor R4, it being remembered that J1 and J2 are installed for 120/240 V operation, thereby shorting around R1 and R5.

An operational amplifier (OP1) that is configured as a comparator senses the magnitude of the ripple current appearing on C2, and generates a pulse width modulated (PWM) signal having a duty cycle that is proportional to the average between the AC voltages on L1 and L2. That is, the width of each pulse is related to the output voltage of the generator (as reflected in the amplitude of the ripple component appearing across C2) so that, as the voltage increases, the pulse width increases accordingly. For a 60 Hz generator, the pulses occur at a frequency of 120 Hz, in that the ripple component on C2 results from full wave rectification of the generator output voltage. A reference voltage for the OP1 comparator is derived, typically, from a voltage dropped across zener diode D5. By example only, D5 is a 5.1 V zener. As such, when the amplitude of the ripple component transitions through the reference voltage set by D5 the output of the comparator OP1 also makes a transition.

The PWM signal output from OP1 is fed through zener diode D11 into the base of transistor Q2. Q2 inverts the PWM signal, thereby making the PWM signal appearing at the collector of Q2 inversely proportional to the average voltage appearing between L1 and L2. The inverted PWM signal is coupled to the gate of a power FET Q1 which is used to control the DC current flow into the rotor windings 14 via the R– and R+ terminals of H2. The DC voltage that is used to power the rotor windings 14 is derived from the separate, center tapped quadrature excitation winding (EW) 13 that is input on the E1 and E2 terminals of H2, and which is full wave rectified by D3 and D4.

In accordance with an aspect of this invention, the DC voltage is also derived from L1 and L2 (located on H1) and is rectified by D17 and D18. The combined rectified DC voltages from D3, D4, D17 and D18 are filtered by C1.

The combination of D6, D7 and RV1 ensure the proper polarity of current flow through the rotor winding 14, and also protect Q1 from inductive transients.

In accordance with an aspect of this invention, and due to the inverse form of the PWM signal at the gate of Q1 (resulting from the operation of Q2), as the average of the voltage between L1 and L2 increases the PWM duty cycle decreases. This reduces the average current flow into the rotor winding 14, thus decreasing the output voltage of the generator. Conversely, as the average of the voltage between L1 and L2 decreases the PWM duty cycle increases at the gate of Q1, thereby increasing the average current flow into the rotor winding 14 and consequently increasing the output voltage of the generator. That is, the rotor winding current is modulated as a function of the inverse of the PWM signal generated from the average voltage appearing across both L1 and L2.

The zener diode D11 in series with the base of Q2 enables the PWM signal voltage to rise to an appropriate level during start-up of the generator before modulation of the rotor current is initiated, thus allowing a consistent build-up of the generator fields and circuit voltages.

Furthermore, feeding the L1 and L2 voltage into the DC field voltage, along with the power from the separate quadrature winding, insures that adequate voltage is available to overcome the threshold voltage of the power FET Q1 during start-up. By example only, D11 is an 8.2 V zener diode. The output of OP1 may vary during start-up. D11 operates to prevent this variation in the output of OP1 from interfering with the generator voltage build-up during start-up. After start-up the output of OP1 remains substantially constant.

The output currents of L1 and L2 are sensed by a toroidal current transformer X1. The signal from X1 is fed into an operational amplifier (OP2) that is configured as an inverting comparator. The reference voltage for OP2 is determined by the resistor network R11, R12, and R13.

In operation, when the current flow sensed by X1 is less than the level established by R11, R12 and R13 the output of OP2 transitions high, thus charging C3 through R15. When C3 is been charged sufficiently for the voltage across C3 to reach the threshold voltage of a MOSFET Q3, Q3 begins to turn on. Q3 controls the current flow to an externally connected electromagnet 16, via connectors T1 and T2, which is used to pull a governor linkage 18 on the engine (prime mover) into an idle position.

In accordance with a further aspect of this invention, the energizing of the electromagnet 16 requires a predetermined period of time that is a function of the RC time constant of R15/C3. In the presently preferred embodiment of this invention this period of time is approximately three seconds. A second inverting comparator OP3 senses the voltage across C3. When the voltage across C3 continues to rise to a level determined by a predetermined reference voltage (also set by resistor network R11, R12, and R13), the comparator OP3 transitions low (to the ground rail) thus switching (paralleling) zener diode D9 and diode D10 across zener diode D5. The transition of OP3 low requires approximately an additional five seconds after OP2 transitions high, or a total of approximately eight seconds after an unloaded condition is detected by X1. By example only, zener diode D9 os a 3.3 V zener. As a result, the voltage drop across the combination of D9 and D10 is less than the voltage across D5 (approximately 5.1 V), and D5 is effectively replaced by the combination of D9 and D10. In that D5 is used to set the reference voltage of OP1, the comparator that is used to generate the proportional PWM signal, the reference voltage of OP1 is effectively lowered. This results in the generation of a higher duty cycle PWM signal. The end result is that the output voltage of the generator is lowered to approximately 75% of the original output voltage through the operation of Q2 and Q1, as described previously.

When X1 senses a current flow that is greater than the set-point of the inverting comparator OP2, OP2 transitions low, thereby immediately discharging C3 through diode D14. This results in Q3 dropping out of conduction and releasing the electromagnet 16 that is holding the engine in idle. As a result, the engine returns to the normal operating speed. The discharging of C3 is sensed by OP3, which transitions high in response. This causes D9 and D10 to be effectively removed from across D5, thus re-establishing OP1 at its original set point and returning the voltage of the generator to the original (normal) output voltage.

Terminals T3 and T4 connect to an idle on/off switch (SW1) shown in FIG. 1. Closing this switch effectively turns off the idle control function by shorting C3 to ground.

A 120 V single output (L1 only) operation is achieved by simply removing jumpers J1 and J2. This places R1 and R5 in series with R2, R4, and R3 and thus into the charge current network for C2. Removing J1 and J2 thus recalibrates the generator for operation at a half wave charging current as opposed to the above-described full wave charging current. The PWM signal output from OP1 is thus generated at one half of the original frequency (since the ripple voltage on C2 is at one half of the original frequency). The DC field voltage is now derived from L1 (through D17) and the quadrature EW 13 (through D3 and D4). The operation of all other aspects of the circuit 10 remains the same.

On a dual output generator the PWM signal that controls the current to the rotor windings 14 is determined by the average between the AC voltages on L1 and L2. As a result, neither output line of the generator can ever rise too high or fall too low in relation to the nominal voltage.

As was noted previously, in a conventional circuit which derives its PWM signal from only one line (L1), a heavy load placed on the monitored line may cause the voltage on the un-monitored line to rise to high levels. Conversely, if a heavy load is placed on the unmonitored line, the voltage regulator will not react to the drop in that lines' voltage. This may result in the induction motor starting capability of that line being compromised. These voltage extremes may also be damaging to any equipment that is connected to the un-monitored line.

In accordance with the teaching of this invention, the control circuit 10 does not exhibit these problems since it monitors both lines (L1 and L2) and treats them with equal weight. As a result, neither line is allowed to vary too far from the nominal voltage, and the induction motor starting capability is equally satisfactory for each line.

Furthermore, the voltage across L1 and L2, or 240 volts in the case of a 120/240 V generator, is held very close to the nominal voltage (typically within 2%).

In accordance with this invention, and as was detailed above, when the generator goes into the idle mode (no current output is being sensed by X1) the circuit 10 delays approximately three seconds before pulling in the governor linkage 18 and slowing down the drive engine. In this manner rapid and repetitive load cycles (such as the drill being used to drill multiple holes) do not cause the drive engine to speed up and slow down. In essence, the circuit 10 delays a predetermined period of time before idling the engine to ensure that another load will not be immediately applied. Also, when the electromagnet 16 is energized by Q3 and begins to pull in the governor linkage 18, thus slowing the engine, the circuit 10 delays a predetermined period of time before dropping the generator output voltage to a lower (e.g., 75% of nominal) voltage. This enables the electromagnet 16 to exhibit a maximum holding power during the "settling down" period while the engine slows to idle. A "pop" or "vibration" of the drive engine during this time is thus less likely to pull the governor linkage 18 off the electromagnet 16.

The lowering of the generator voltage during idle periods is an important aspect of this invention. As may be realized, if the voltage were not lowered during this time the regulator circuitry would attempt to keep the generator voltage at its nominal level. However, since the speed of the engine is lowered during idle periods, the generating capability of the generator is reduced, resulting ultimately in large currents being applied to the rotor 14. This is generally unacceptable as it tends to overheat the rotor (due to the extremely high currents and the reduced airflow resulting from lower generator speeds). Reducing the generator output voltage during an idle period beneficially eliminates the high rotor currents.

The output windings 12 (L1 and L2) contain more turns than the excitation windings 13, and therefore produce a higher voltage from the residual magnetism of the generator laminations. Feeding the voltage from the output windings 12 into the DC field, along with power from the separate excitation windings 13, allows the regulator to readily self-excite with the use of a lower voltage excitation winding. As the generator voltage builds up, the output voltage from the output windings L1 and L2 is reduced by the PW modulation to a level that is approximately that of the voltage of the excitation windings 13. As a result, most of the excitation power is supplied, under normal operation, by the excitation windings 13, and under start-up by the output windings 12 (L1 and L2). The use of the lower voltage excitation windings 13 allows the generator voltage to collapse under extremely heavy overloads at a proper rate, therefore avoiding an extreme overload of the engine (prime mover). This results in the maximization of induction motor starting capability, while retaining proper voltage regulation under full load conditions. A proper collapse rate for the generator voltage is one that provides an optimum relationship between the output voltage and a given electrical overload to prevent a mechanical overload.

In view of the foregoing description of a presently preferred embodiment of the invention, it should be realized that various modifications of this preferred embodiment may be made, and that these modifications are within the scope of the teaching of the invention. By example, it is within the scope of this invention to employ other circuit configurations, voltages, time delays, and/or zener diode values while still accomplishing the control features of this invention. Furthermore, the teaching of this invention may be extended to three phase generators.

As such, although these and other modifications of the preferred embodiment of the invention may occur to those having skill in the art, this invention is not intended to be limited to only the preferred embodiment described above, but is instead intended to be given a scope commensurate with the scope of the claims that follow.

What is claimed is:

1. An alternating current electrical generator of the type having a drive engine, a rotor winding, and at least one output winding, comprising:

means for varying a duty cycle of a pulse width modulated signal as a function of an output voltage appearing across said at least one output winding so as to increase the duty cycle as the output voltage decreases and to decrease the duty cycle as the output voltage increases;

means for controlling the current flow within the rotor winding in accordance with the pulse width modulated signal so as to decrease the current flow when the output voltage increases and to increase the current flow when the output voltage decreases;

means for monitoring a current flow through the at least one output winding so as to detect an unloaded condition;

means, responsive to the detection of an unloaded condition, for delaying a first predetermined period of time before initiating an idle condition by slowing the speed of the drive engine; and means, responsive to the detection of the unloaded condition, for delaying a second predetermined period of time before automatically decreasing the duty cycle of the pulse width modulated signal so as to decrease the current flow within the rotor winding to thereby decrease the output voltage.

2. A generator as set forth in claim 1 wherein the at least one output winding is comprised of a first line L1 and a second line L2, and wherein the means for varying includes means for monitoring the voltage appearing across both L1 and L2 with respect to neutral.

3. A generator as set forth in claim 2 wherein the means for monitoring is comprised of a rectifier, a filter capacitor, and a comparator having a first input that is coupled to a reference potential and a second input that is coupled to the filter capacitor for detecting a magnitude of a ripple voltage component that appears across the filter capacitor.

4. A generator as set forth in claim 1 wherein said means for delaying and initiating is comprised of:

an electromagnet that is magnetically coupled, when energized, to a governor linkage that is coupled to the drive engine.

5. A generator as set forth in claim 1 wherein the means for varying is comprised of a rectifier, a filter capacitor, and a comparator having a first input that is coupled to a reference potential and a second input that is coupled to the filter capacitor for detecting a magnitude of a ripple voltage component that appears across the capacitor, and wherein the means for delaying a second predetermined period of time before automatically decreasing the duty cycle is comprised of circuit means for changing said reference potential at the expiration of the second predetermined period of time.

6. An alternating current electrical generator of the type having a drive engine, a rotor winding, and a plurality of output windings, comprising:

means for rectifying output voltages of said plurality of output windings to provide a dc voltage having a ripple component that has an amplitude that is a function of a combination of the magnitudes of the output voltages;

means for varying a duty cycle of a pulse width modulated signal as a function of the amplitude of the ripple component so as to increase the duty cycle as the output voltages decrease and to decrease the duty cycle as the output voltages increase;

means for controlling the current flow within the rotor winding in accordance with the pulse width modulated signal so as to decrease the current flow when the output voltages increase and to increase the current flow when the output voltages decrease; and means for configuring said rectifying means as one of a full wave rectifier, when the output voltage is nominally 240 V, and a half wave rectifier, when the output voltage is nominally 120 V.

7. A method for controlling a rotor winding current of an alternating current electrical generator of the type having a drive engine, at least one output winding, and an excitation winding, comprising the steps of:

during a start-up condition, rectifying an AC voltage output by the excitation winding to produce a first rectified DC voltage;

rectifying an AC voltage output by the at least one output winding to produce a second rectified DC voltage;

combining and filtering the first and second rectified DC voltages to produce a rotor winding drive current; and at a predetermined magnitude of the AC voltage output by the at least one output winding;

varying the duty cycle of a pulse width modulated signal as a function of the AC voltage appearing across the at least one output winding so as to increase the duty cycle as the AC voltage decreases and to decrease the duty cycle as the AC voltage increases; and controlling the rotor winding drive current in accordance with the pulse width modulated signal so as to decrease the rotor winding drive current when the AC voltage increases and to increase the rotor winding drive current when the AC voltage decreases.

8. A method for controlling an alternating current electrical generator of the type having a drive engine, a rotor winding, and at least one output winding including a first line L1 and a second line L2, comprising the steps of:

monitoring voltages appearing across both L1 and L2 with respect to neutral to obtain monitored voltages;

varying the duty cycle of a pulse width modulated signal as a function of a combination of the monitored voltages so as to increase the duty cycle as the monitored voltages decrease and to decrease the duty cycle as the monitored voltages increase; and controlling the current flow within the rotor winding in accordance with the pulse width modulated signal so as to decrease the current flow when the monitored voltages increase and to increase the current flow when the monitored voltages decrease; wherein the method further includes the steps of, monitoring a current flow through the at least one output winding so as to detect an unloaded condition and, in response to detecting an unloaded condition, delaying a first predetermined period of time; and initiating an idle condition by slowing the speed of the drive engine.

9. A method as set forth in claim 8 and further in response to detecting an unloaded condition, the method includes the steps of:

delaying a second predetermined period of time; and automatically decreasing the duty cycle of the pulse width modulated signal so as to decrease the current flow within the rotor winding to thereby decrease the voltages appearing across both L1 and L2.

10. A method as set forth in claim 8 wherein the step of varying the duty cycle of the pulse width modulated signal varies the duty cycle in accordance with the average voltage between L1 and L2.

11. An alternating current electrical generator of the type having a drive engine, a rotor winding, and at least one output winding including a first line L1 and a second line L2, comprising:

means for monitoring voltages appearing across both L1 and L2 with respect to neutral to obtain monitored voltages;

means for varying a duty cycle of a pulse width modulated signal as a function of a combination of the monitored voltages appearing across said L1 and L2 with respect to neutral so as to increase the duty cycle as the monitored voltages decrease and to decrease the duty cycle as the monitored voltages increase;

means for controlling the current flow within the rotor winding in accordance with the pulse width modulated signal so as to decrease the current flow when the monitored voltages increase and to increase the current flow when the monitored voltages decrease;

means for monitoring a current flow through both of said L1 and L2 so as to detect an unloaded condition;

means, responsive to the detection of an unloaded condition, for delaying a first predetermined period of time before initiating an idle condition by slowing the speed of the drive engine; and means, responsive to the detection of the unloaded condition, for delaying a second predetermined period of time before automatically decreasing the duty cycle of the pulse width modulated signal so as to decrease the current flow within the rotor winding to thereby decrease the voltages appearing across said L1 and L2 with respect to neutral.

* * * * *